United States Patent
Gonda et al.

(10) Patent No.: US 9,371,095 B2
(45) Date of Patent: Jun. 21, 2016

(54) MOTOR VEHICLE BODY HAVING A REAR FLOOR AND A CROSS-MEMBER

(71) Applicant: Bayerische Motoren Werke Aktiengesellschaft, Munich (DE)

(72) Inventors: Mihaly Gonda, Munich (DE); Thomas Weiss, Feldafing (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/309,031

(22) Filed: Jun. 19, 2014

(65) Prior Publication Data

US 2014/0300138 A1    Oct. 9, 2014

Related U.S. Application Data

(63) Continuation of application No. PCT/EP2012/073745, filed on Nov. 27, 2012.

(30) Foreign Application Priority Data

Dec. 19, 2011    (DE) .......................... 10 2011 089 044

(51) Int. Cl.
   *B62D 29/00*    (2006.01)
   *B62D 29/04*    (2006.01)
   *B62D 25/20*    (2006.01)

(52) U.S. Cl.
   CPC .......... *B62D 29/046* (2013.01); *B62D 25/2027* (2013.01); *B62D 29/041* (2013.01)

(58) Field of Classification Search
   USPC ................................ 296/193.07, 204, 187.08
   See application file for complete search history.

(56) References Cited

U.S. PATENT DOCUMENTS

| 2,856,226 | A | * | 10/1958 | Purdy ........................... 296/204 |
| 5,102,187 | A |   | 4/1992  | Harasaki |
| 5,129,700 | A |   | 7/1992  | Trevisan et al. |
| 5,549,349 | A | * | 8/1996  | Corporon et al. ........ 296/187.12 |
| 6,073,991 | A | * | 6/2000  | Naert ....................... 296/187.02 |
| 6,299,240 | B1 |  | 10/2001 | Schroeder et al. |
| 7,658,440 | B2 | * | 2/2010 | Tohda et al. .................. 296/204 |
| 2005/0104356 | A1 | * | 5/2005 | Vincenti ....................... 280/795 |

FOREIGN PATENT DOCUMENTS

| DE | 38 01 337 C2 | 7/1992 |
| DE | 690 13 478 T2 | 2/1995 |
| DE | 100 14 837 A1 | 9/2001 |
| DE | 10 2005 024 265 A1 | 12/2006 |
| DE | 10 2006 015 416 A1 | 10/2007 |

(Continued)

OTHER PUBLICATIONS

International Search Report dated Feb. 12, 2013 with English translation (Four (4) pages).

(Continued)

*Primary Examiner* — Joseph D Pape

(74) *Attorney, Agent, or Firm* — Crowell & Moring LLP

(57) ABSTRACT

A motor vehicle body includes a body center section. The body center section has a rear floor and a cross member connected thereto, which are made of fiber-reinforced plastic material. The cross member preferably extends between a left lateral longitudinal beam and a right lateral longitudinal beam. The motor vehicle body can be self-supporting.

18 Claims, 9 Drawing Sheets

(56) References Cited

FOREIGN PATENT DOCUMENTS

DE  10 2006 052 992 A1  5/2008
DE  10 2010 005 367 A1  7/2011

OTHER PUBLICATIONS

German Search Report dated Oct. 29, 2012 with partial English translation (Ten (10) pages).

* cited by examiner

MOTOR VEHICLE BODY HAVING A REAR FLOOR AND A CROSS-MEMBER

CROSS REFERENCE TO RELATED APPLICATIONS

This application is a continuation of PCT International Application No. PCT/EP2012/073745, filed Nov. 27, 2012, which claims priority under 35 U.S.C. §119 from German Patent Application No. 10 2011 089 044.0, filed Dec. 19, 2011, the entire disclosures of which are herein expressly incorporated by reference.

BACKGROUND AND SUMMARY OF THE INVENTION

The present invention relates to a motor vehicle body comprising a body center section, which includes a rear floor and a cross member, and to a motor vehicle comprising such a motor vehicle body.

Motor vehicle bodies, in particular self-supporting motor vehicle bodies, are typically made of steel. Moreover, for bodies having a space frame design, it is known to produce the frame construction from steel or aluminum and to insert plate elements made of plastic material in the frame construction. For example, the published prior art DE 10 2006 052 992 A1 shows a frame structure for the underbody of a motor vehicle body, which includes a center tunnel, a heel plate and lateral sills, which are all part of the frame structure, which is made of high-strength steel. A front floor, which is to say a floor in front of the heel plate, and a rear floor, which is to say a floor behind the heel plate, are made of a plastic material, which is in part reinforced with metal so as to improve crash resistance/strength during impact.

It is now the object of the present invention to create a motor vehicle body comprising a body center section that is lighter in weight and has a required impact resistance.

This object is achieved by a motor vehicle body comprising a body center section that includes a rear floor and a cross member connected thereto, wherein the rear floor and the cross member are made of fiber-reinforced plastic material.

A connection between the rear floor and the cross member can preferably be an adhesive joint, which is to say that the rear floor can be glued to the cross member.

By using fiber-reinforced plastic material for the rear floor and the cross member connected thereto, the body center section is considerably lighter in weight, while meeting the requirements in regard to rigidity of the body center section in normal driving operation, as well as strength and energy absorption capability of the body center section in the event of a side impact/side crash.

According to the present invention, the cross member preferably extends between a left lateral longitudinal beam and a right lateral longitudinal beam in the motor vehicle body.

The rear floor can likewise preferably extend between the left lateral longitudinal beam and the right lateral longitudinal beam.

Moreover, the cross member can be glued to the left lateral longitudinal beam and the right lateral longitudinal beam. The rear floor can likewise preferably be glued to the left lateral longitudinal beam and the right lateral longitudinal beam.

According to one refinement of the present invention, the cross member is disposed between a front floor and the rear floor on the motor vehicle body. An upper end of the cross member can be connected to the rear floor. Moreover, a lower end of the cross member can be connected to the front floor. The connections are preferably designed as adhesive joints.

According to this refinement, the upper end of the cross member can be connected to a top side or a bottom side of the rear floor. To this end, an upper end region of the cross member, which includes the upper end of the cross member, can be designed to overlap a front end region of the rear floor.

The upper end region of the cross member and the front end region of the rear floor together can form a closed hollow section. In the case of a closed hollow section, there are at least two connecting regions, such as glued regions, between the cross member and the rear floor. For example, the front end of the rear floor is then connected in particular to the beginning of the upper end region of the cross member, and the upper end of the cross member is connected to a beginning of the front end region of the rear floor.

If the cross member is joined to the bottom side of the rear floor, the front end region of the rear floor can extend over the upper end region of the cross member and overlap the same.

Conversely, if the cross member is joined to the top side of the rear floor, the front end region of the rear floor can extend over the upper end region of the cross member and overlap the same.

A closed hollow section is more advantageous than an open section in terms of rigidity and strength in many load directions. By utilizing both components, these being the cross member and the rear floor, for the hollow section, only a small number of components are required. A closed section here refers to a section that is closed in a sectional view in the direction of the longitudinal vehicle axis and the vertical vehicle axis.

According to one refinement, the cross member can be formed of a front cross member element and a rear cross member element, which are connected to each other.

The front cross member element and the rear cross member element can overlap each other in an upper region of the cross member. The overlap can be formed in particular in a substantially horizontal region of the cross member. The overlap can extend essentially over the entire upper region of the cross member.

In particular if the upper end region of the cross member overlaps the front end region of the rear floor, the overlap of the front cross member element and of the rear cross member element can be designed above the front end region of the floor. In particular, the overlap of the front cross member element and of the rear cross member element can extend together with the rear floor in a highest region of the cross member.

The overlap in the upper region of the cross member results in a material augmentation in this region and can contribute considerably to flexural strength of the cross member about a longitudinal axis. This increased flexural strength is necessary especially during a side impact.

Instead of an overlap, a higher material thickness can also be used in the upper region of the cross member. This is possible both with a single-piece design of the cross member and with a multi-piece design of the cross member.

Moreover, in an alternative refinement of the present invention, the cross member is joined to a front end region of the rear floor and the rear floor is connected to a front floor in the motor vehicle body. According to this alternative refinement, the cross member in particular preferably forms a closed hollow section together with the front end region of the rear floor.

In this alternative refinement, the cross member can also be composed of at least two cross member elements, such as a front and a rear cross member element, which preferably overlap each other at the connecting point thereof. Likewise, the connecting point can be located in a highest region of the cross member, together with the rear floor.

Moreover, in all refinements, a rear end of a center tunnel is preferably joined to the cross member and/or the rear floor.

The center tunnel can extend over the entire body center section. The center tunnel is a region that spans a gap between a right front floor and a left front floor, for example in the form of an inverted U, and beneath which drive elements and/or energy storage elements can be accommodated.

All the described connections between components are preferably designed as glued joints. As an alternative, other joining techniques or additional joining techniques can be used.

In a motor vehicle body according to the present invention, a primary fiber direction runs in the transverse vehicle direction. In other words, a plurality of fibers of the rear floor and of the cross member are oriented in a transverse vehicle direction.

The rear floor and/or the cross member are preferably composed of multiple unidirectional fiber layers, wherein the fiber orientation of each fiber layer can deviate from the transverse vehicle direction by an angle of up to approximately 45° C. Moreover, the orientation of the fibers of one fiber layer can be offset with respect to the orientation of the fibers of another fiber layer by up to approximately 90°. The fiber orientation of at least one fiber layer can preferably extend in the transverse vehicle direction.

For example, the fiber-reinforced plastic material is composed of at least five fiber layers, wherein the center fiber layer extends in the transverse vehicle direction, and the remaining fiber layers extend at an angle of approximately −45° or +45° with respect to the center fiber layer. For example, the first fiber layer extends at an angle of +45°, the second fiber layer extends at an angle of −45°, the third fiber layer extends at an angle of 0° (which is to say in the transverse vehicle direction), the fourth fiber layer extends at an angle of −45°, and the fifth fiber layer extends at an angle of +45°, relative to the transverse vehicle direction.

Particularly high strength in the transverse direction as well as in directions of the motor vehicle body that deviate slightly therefrom can thus be achieved.

Moreover, the body center section, which is to say essentially the entire body center section, is made of fiber-reinforced plastic material in the motor vehicle body according to the present invention.

The motor vehicle body is preferably self-supporting.

The motor vehicle body, which is to say at least the body center section, is preferably designed in what is known as a monocoque construction, including the rear floor and the cross member, wherein the rear floor and the cross member form parts within the meaning of the monocoque construction.

The body center section extends at least within a region between a front axle and a rear axle of the motor vehicle. In the front region, the body center section starts with a front bulkhead, and in the rear region of the body center section, the body center section ends with a rear partition or at least behind a rear row of seats. The body center section comprises in particular what is known as a passenger cell.

Moreover, the motor vehicle body according to the present invention is preferably a motor vehicle body for a motor vehicle having at least one front seat row and one rear seat row, wherein the rear floor is located beneath the seat surface of the rear seat row.

The fiber-reinforced plastic material is preferably carbon fiber reinforced plastic material (CFRP).

The cross member and the rear floor can be produced by way of a transfer molding process, which is also referred to as a resin transfer molding (RTM) method. In the resin transfer molding process, for example, a semi-finished fiber product is inserted as a preform into a mold. Thereafter, resin is injected into the closed mold, for example. However, it is also possible to use other methods for producing the cross member and the rear floor.

All directional information such as top, bottom, front and back, transverse direction, longitudinal direction and the like refer to a motor vehicle body, of course, as it is installed and used in a motor vehicle during normal operation.

Other objects, advantages and novel features of the present invention will become apparent from the following detailed description of one or more preferred embodiments when considered in conjunction with the accompanying drawings.

The exemplary embodiments of the present invention are described hereafter in detail.

DETAILED DESCRIPTION OF THE DRAWINGS

FIGS. 1 to 4 show a first exemplary embodiment of the present invention.

Figure 1:
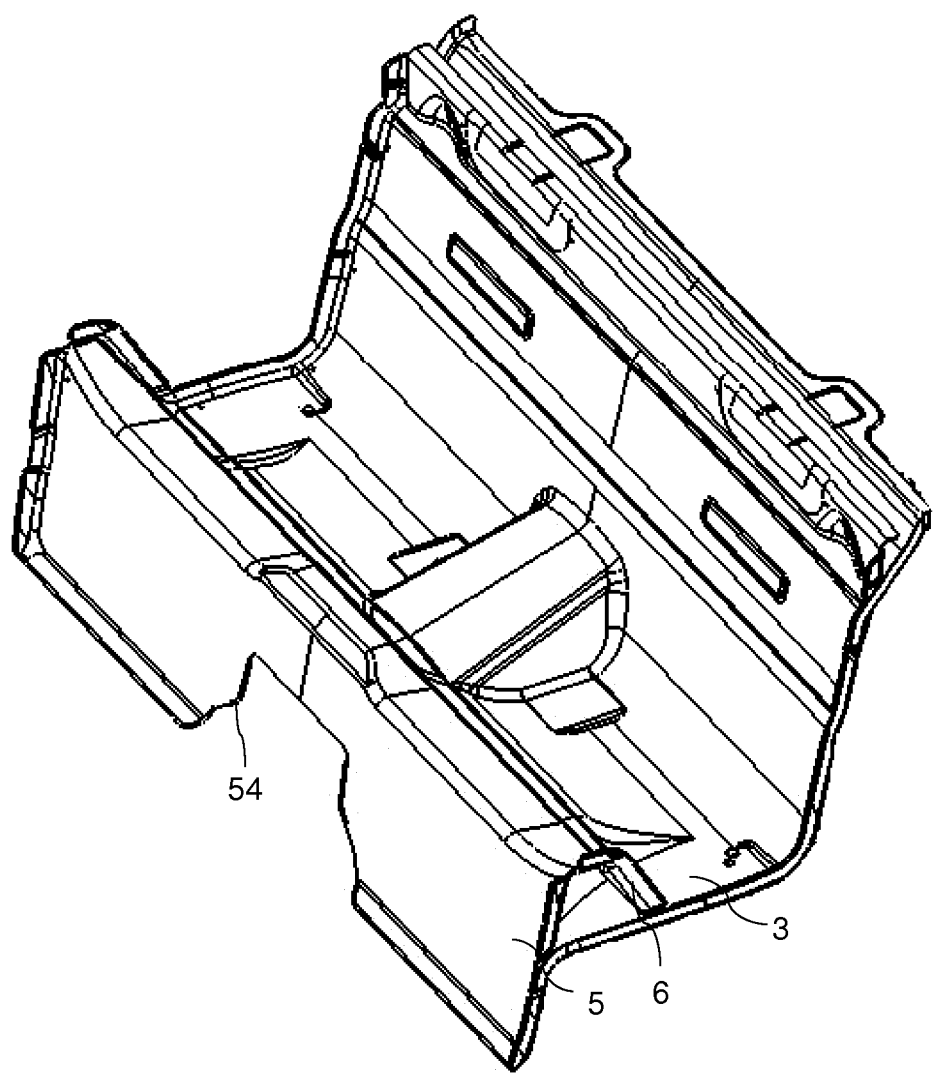
FIG. 1 shows a perspective view of a portion of a motor vehicle body, in particular of a rear floor and of a cross member connected thereto, according to a first exemplary embodiment of the present invention.

In particular, FIG. 1 shows a perspective view of a rear floor 3 in conjunction with a cross member 5, 6. The cross member 5, 6 is composed of a front cross member element 5 and a rear cross member element 6, as can be seen from the perspective exploded view of FIG. 2 and the sectional view of FIG. 3.

Figure 2:
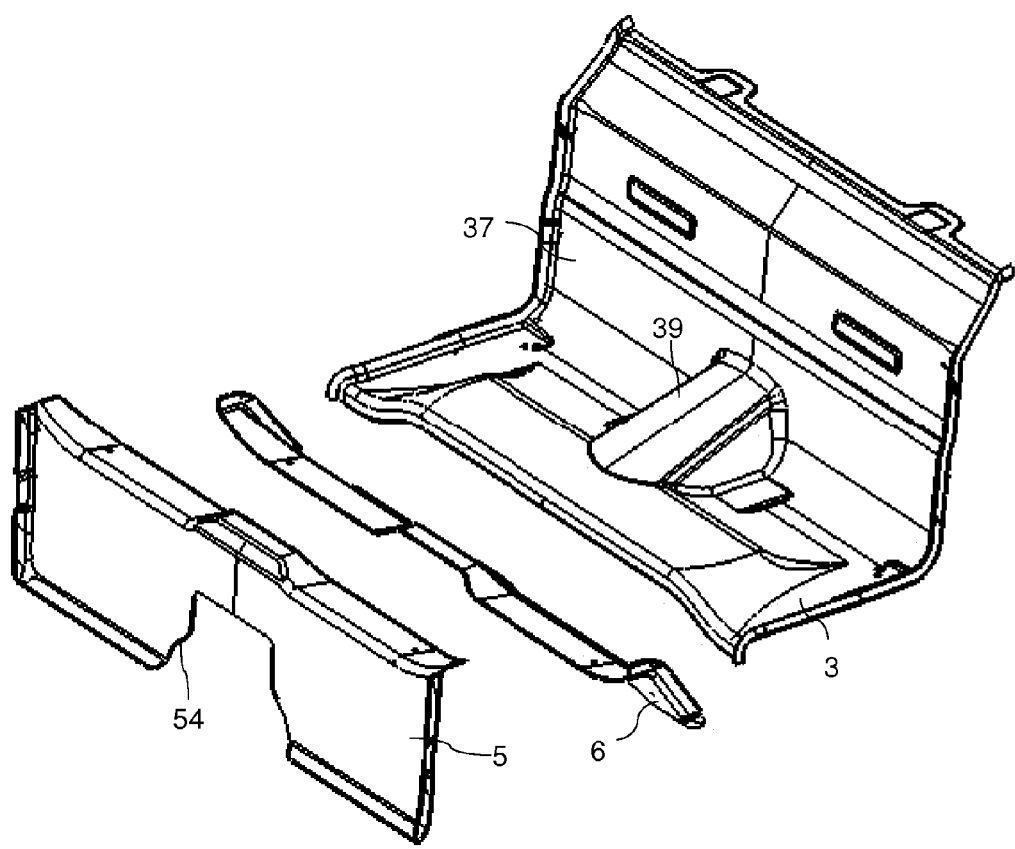
FIG. 2 shows a perspective exploded view of the rear floor and of the cross member connected thereto according to the first exemplary embodiment of the present invention.
Figure 3:
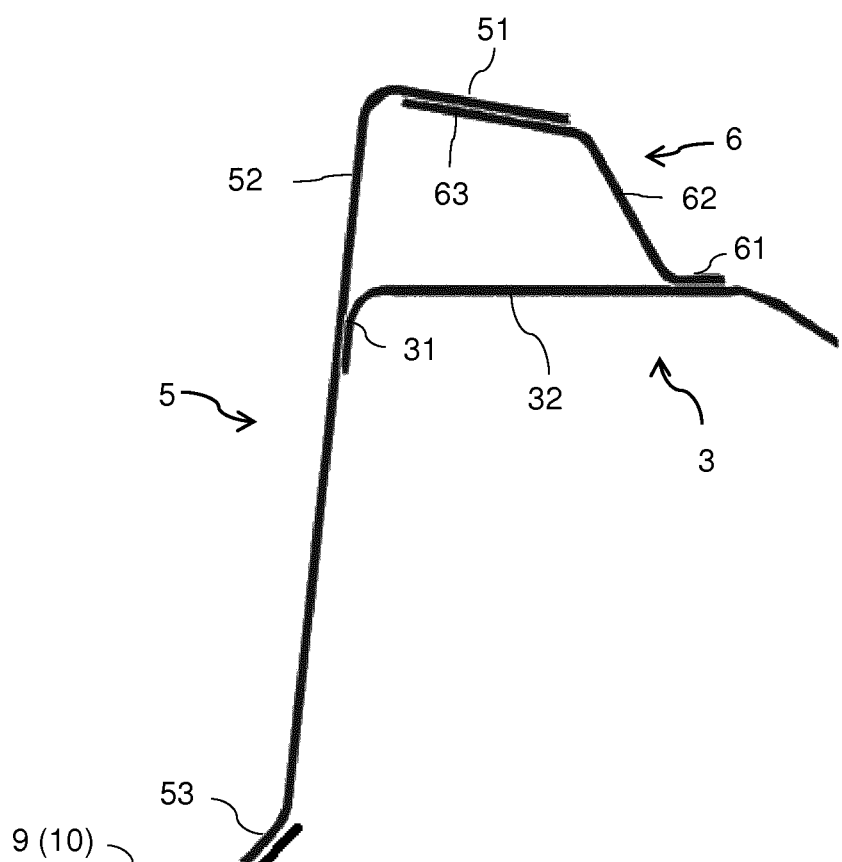
FIG. 3 shows a schematic sectional view of the rear floor and of the cross member connected thereto according to the first exemplary embodiment of the present invention.

As is shown in the schematic sectional view of FIG. 3, for example, the front cross member element 5 is composed of a region that is substantially vertical, or at least inclined slightly toward the back, which includes at least a portion of an upper end region 52 of the cross member, and a region 51 that is substantially horizontal, or at least inclined slightly downward, which is part of the upper end region 51. The substantially vertical region includes a cut-out 54 for a center tunnel, as can be seen in FIGS. 1 and 2. The front cross member element 5 can also be referred to as a heel plate. The rear cross member element 6 is composed of a substantially horizontal region 63 and a region 62 adjoining thereon that extends obliquely downward and toward the back. The horizontal region 51 of the front cross member element 5 and the horizontal region 63 of the rear cross member element 6 overlap across almost the entire surfaces thereof and are glued to each other. Moreover, the rear floor 3 is glued at the flange-shaped end 31 thereof to the front cross member element 5, which is to say to the beginning of the upper end section 52. Moreover, the rear cross member element 6 is connected at the rear flange-shaped end 61 thereof, which represents an upper end of the cross member according to the invention, to the top side of the floor 3 in a front end section 32 of the rear floor 3. The front cross member element 5, and in particular the sections 52 and 51, the rear cross member element 6 and the rear floor 3, and in particular the front end section 32 of the rear floor 3, thus form a closed section. This creates a particularly rigid construction having high strength in the event of a side impact.

Figure 4:
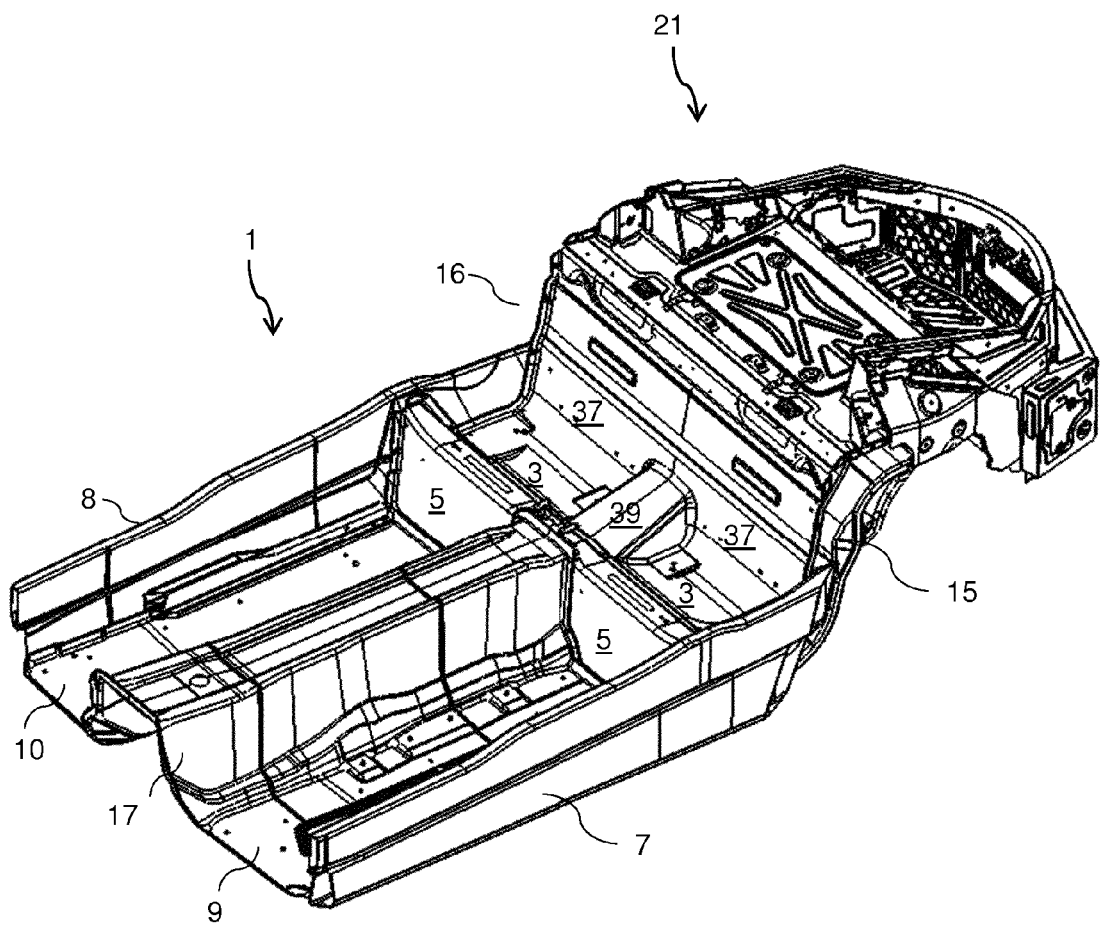
FIG. 4 shows a perspective view of a portion of a body center section and of a body rear section according to the first exemplary embodiment of the present invention.

FIG. 4 shows a perspective view, which illustrates the joining of the rear floor 3, together with the cross member 5, 6, to adjoining elements of the body center section 1 and a body rear section 21.

In particular, the front cross member element 5 is connected to a center tunnel 17. The center tunnel 17 runs from a front bulkhead (not shown) of the body center section 1 to the front cross member element 5 within a passenger cell of the body center section 1. Moreover, a left longitudinal beam 7 and a right longitudinal beam 8 are formed to the left and right of the cross member 5, 6, respectively. The cross member elements 5 and 6 are glued to the left longitudinal beam 7 and the right longitudinal beam 8 by way of flange-shaped projections.

Moreover, a left front floor 9 and a right front floor 10 are glued to the flange-shaped lower end 53 of the cross beam, in particular of the cross beam element 5. The left front floor 9 extends between the center tunnel 17, the lower end 53 of the cross beam element 5 and the left longitudinal beam 7. The right front floor 10 extends accordingly between the center tunnel 17, the right longitudinal beam 8 and the lower end 53 of the front cross member element 5.

The rear floor 3 includes an integral center tunnel 39, which is designed at least in part in continuation of the center tunnel 17. Moreover, the rear floor 3 transitions integrally into a rear partition 37, which extends substantially vertically. The partition 37, which can also be referred to as a rear bulkhead, forms part of a rear end of the body center section 1.

The partition 37 extends from a left wheel arch support 15 to a right wheel arch support 16 and is glued thereto. The left longitudinal beam 7 is connected to the left wheel arch support 15, and the right longitudinal beam 8 is connected to the right wheel arch support 16. The left and right wheel arch supports 15, 16 extend from the respective longitudinal beam behind the partition over a left and right rear wheel, which are not shown. The wheel arch supports 15 and 16 thus extend from the respective longitudinal beam upward, and then toward the back above the rear wheels.

The wheel arch supports 15 and 16 form part of the rear section 21, which starts behind the partition 37.

The rear floor 3 and the rear partition 37 can also be designed separately from each other.

Likewise, the center tunnel 17 and/or the center tunnel 39 could be omitted, if one is, or both are, not required.

Moreover, the cross beam elements 5 and 6 can be designed integrally with each other.

Moreover, the rear floor 3 and the front floors 9, 10 are disposed at differing levels, which is to say the rear floor 3 extends at a higher level than the front floors 9, 10. In principle, it is also contemplated for these to be disposed at an approximately equal level.

Figure 5:
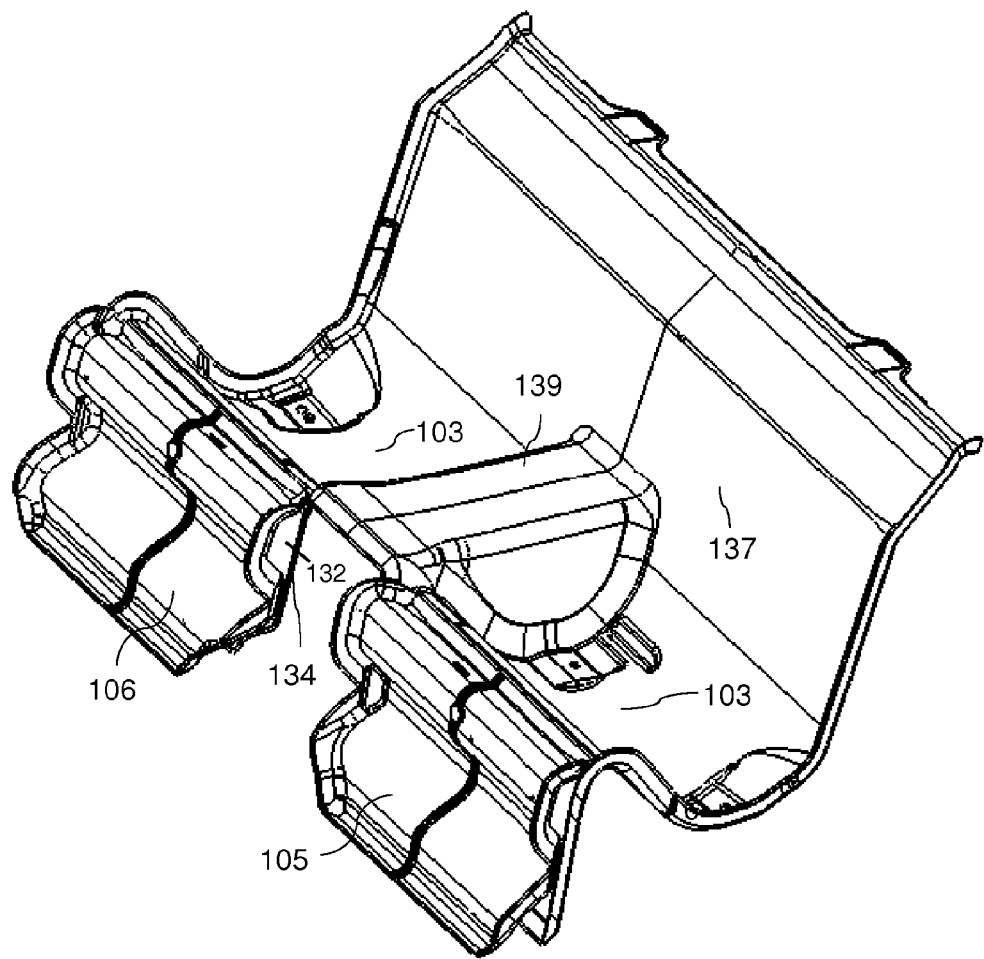
FIG. 5 shows a perspective view of a portion of a motor vehicle body, in particular of a rear floor and of a cross member connected thereto, according to a second exemplary embodiment of the present invention.
Figure 6:
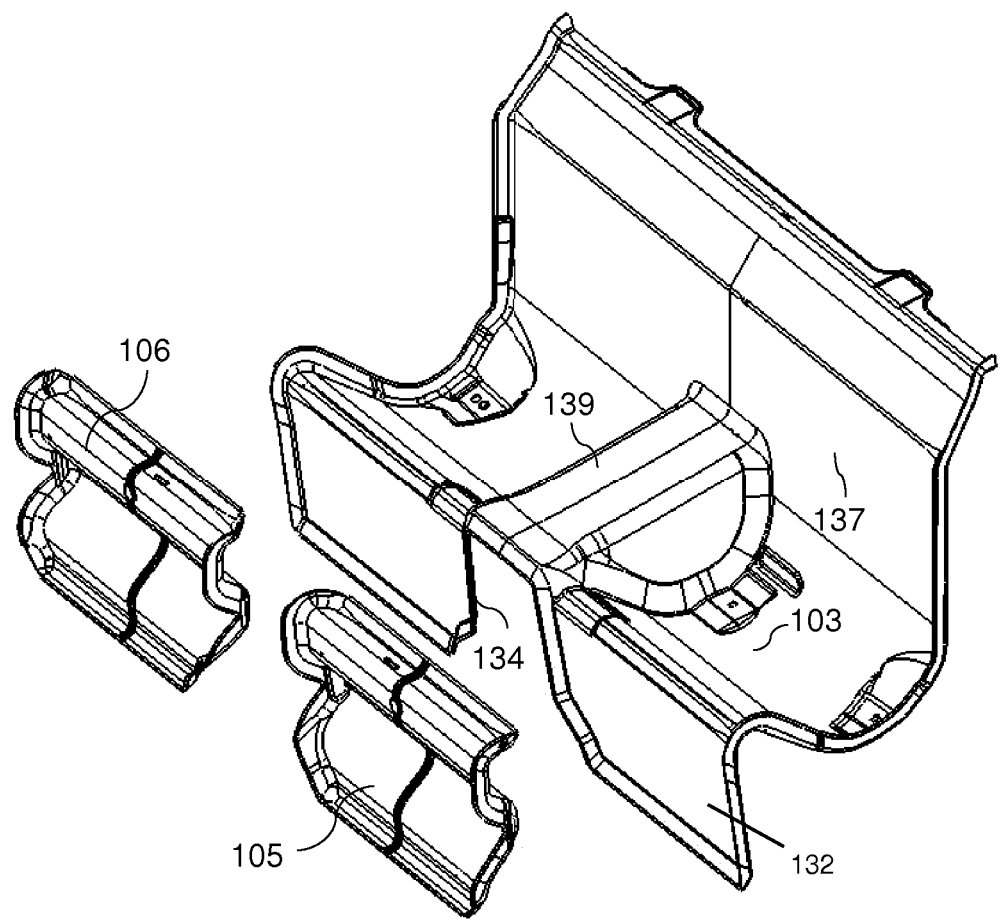
FIG. 6 shows a perspective exploded view of the rear floor and of the cross member connected thereto according to the second exemplary embodiment of the present invention.
Figure 7:
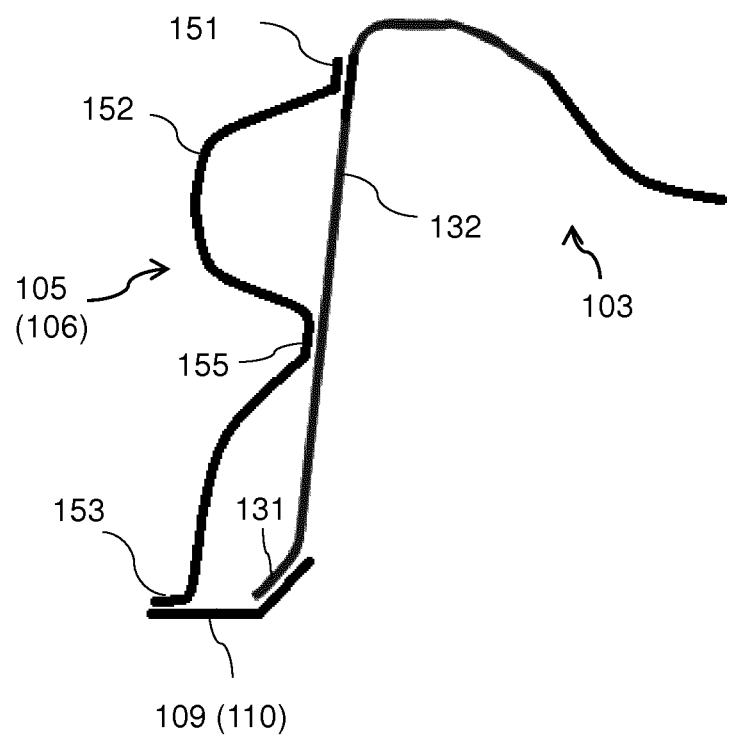
FIG. 7 shows a schematic sectional view of the rear floor and of the cross member connected thereto according to the second exemplary embodiment of the present invention.

A second exemplary embodiment of the present invention is described hereafter based on FIGS. 5 to 7. In particular the differences of the second exemplary embodiment as compared to the first exemplary embodiment are described, wherein a description of the common features is essentially omitted.

As is shown in FIGS. 5 and 6, contrary to the first exemplary embodiment, a front end region 132 of a floor 103 extends substantially vertically downward, where it is connected to a front floor 109 or 110. A cross member is composed of a left cross member element 105 and a right cross member element 106, which are joined or connected to the front end region 132 of the floor 103 to the left and right of a center tunnel section 134 of the front end region 132 of the rear floor 103. Together with the rear floor 103, which is to say in particular with the front end region 132 of the rear floor 103, the cross member element 105, 106 forms a closed section, as can be seen in FIG. 7. At the upper end 151 (161) and the center 155 (165), the cross member element 105 (106) is glued to the front end region 132 of the rear floor 103. Moreover, a lower end 153 (163) of the cross member element 105 (106) is glued to the front floor 109 (110).

As a result, the front end region 132 of the rear floor 103, the upper end region 152 of the cross member 105 (106), and also the lower end region of the cross member, thus also form a closed section in the second exemplary embodiment.

As with the first exemplary embodiment, all described elements are glued to each other in the second exemplary embodiment. In particular, the left and right cross member elements 105, 106 are glued to a center tunnel, which is not shown in the figures, or they are glued to the left and right longitudinal beams, which are also not shown in the figures.

According to the second exemplary embodiment, the cross member elements 105 and 106 are separated from each other by the center tunnel. However, it is also possible to design the cross member elements 105, 106 integrally with each other if no center tunnel is present, or if these extend over the center tunnel.

Figure 8:
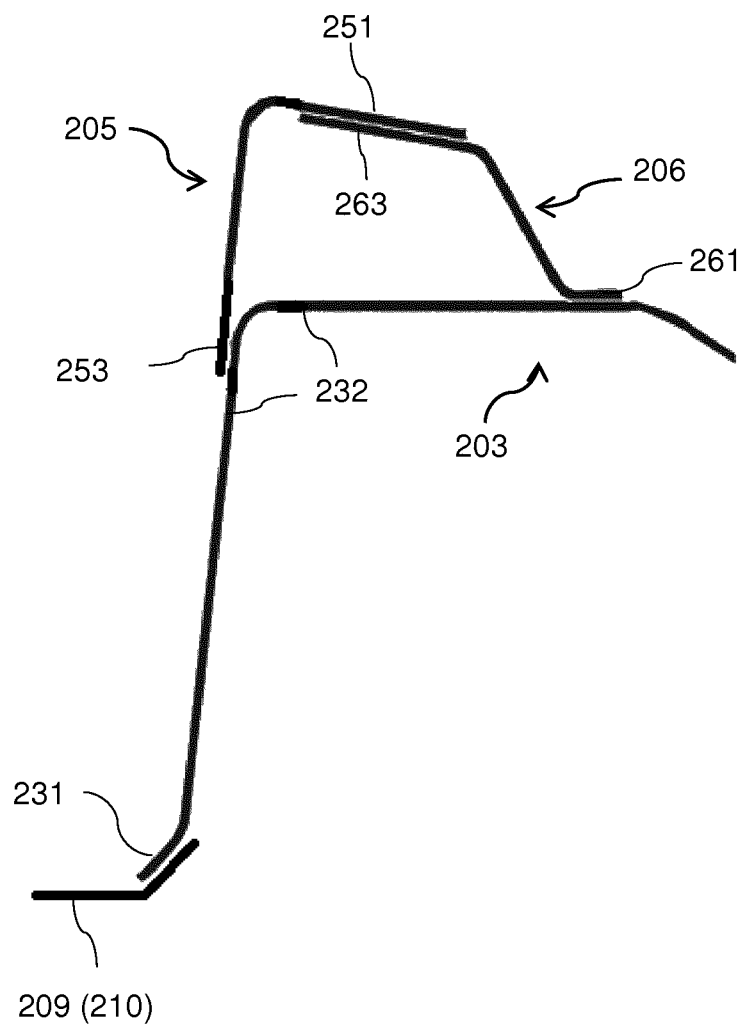
FIG. 8 shows a schematic sectional view of a rear floor and of a cross member connected thereto according to a third exemplary embodiment of the present invention.

A third exemplary embodiment of the present invention is described hereafter with reference to FIG. 8, which shows a schematic sectional view of a third exemplary embodiment of the present invention, wherein essentially only differences compared to the first and second exemplary embodiments are described.

According to the third exemplary embodiment of the present invention, the rear floor 203 is connected to a cross member 205, 206. The cross member 205, 206 is designed in particular essentially in the shape of a "U." At the free legs of the "U" the cross member is connected to a top side of a front end region 232 of the rear floor 203. The cross member is composed of a front cross member element 205 and a rear cross member element 206, which at the respective substantially horizontal regions 251 and 263 are connected, which is to say glued, to each other so as to overlap, analogously to the first exemplary embodiment. An effect corresponding to the first exemplary embodiment is thus achieved. A lower end 253 of the cross member element 205 forms one end of a free leg of the "U" and a flange-shaped end 261 of the cross member element 206 forms a free leg of the "U," each being connected to the front end region 232 of the rear floor 203.

Moreover, a front end 231 of the rear floor 203 is connected to a front floor 209 or 210, analogously to the second exemplary embodiment.

As with the first and second exemplary embodiments, a center tunnel may be formed.

Moreover, the rear floor 203 can be designed integrally with a rear partition, as with the first and second exemplary embodiments.

Figure 9:
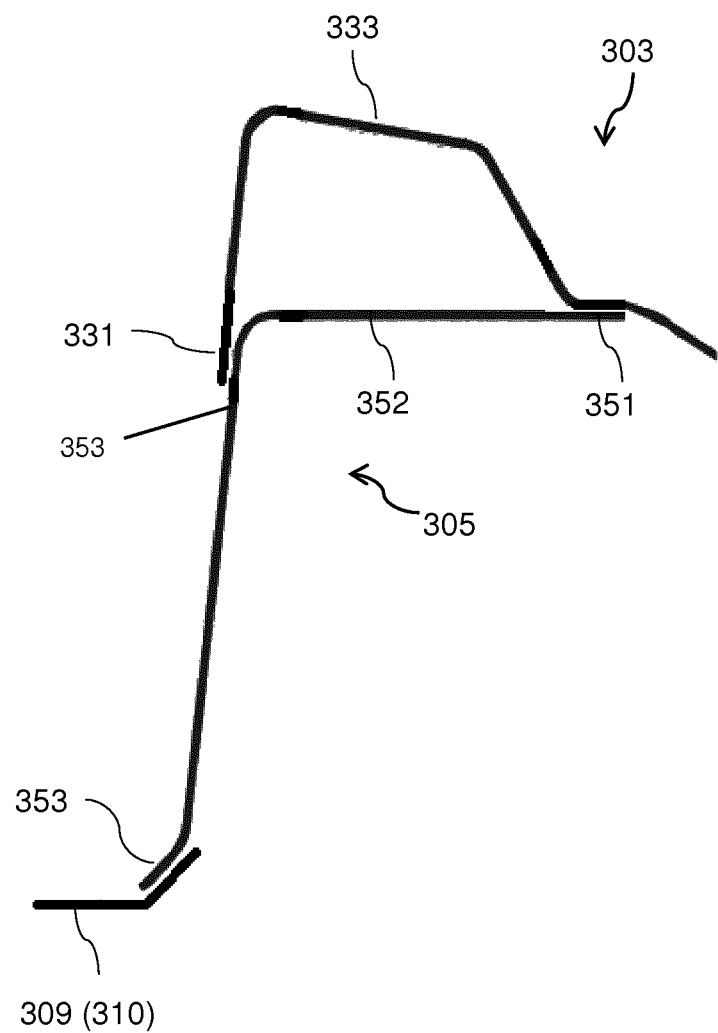
FIG. 9 shows a schematic sectional view of a rear floor and of a cross member connected thereto according to a fourth exemplary embodiment of the present invention.

A fourth exemplary embodiment of the present invention is described hereafter with reference to FIG. 9, which analogously to FIGS. 3, 7 and 8 shows a schematic sectional view along a vertical plane extending in the longitudinal direction, wherein essentially only differences compared to the first to third exemplary embodiments are described.

A rear floor 303 is connected to a cross member 305. In particular, an upper end 351 of the cross member 305 is glued to a bottom side of a front end region 333 of the rear floor 303. Moreover, a front end 331 of the rear floor 303 is connected to an upper end region 353 of the cross member 305. The front end region 333 of the rear floor 303 and the upper end region 353 of the cross member 305 overlap in such a way that they form a closed hollow section according to FIG. 9. In addition, a lower end 355 of the cross member 305 is glued to a front floor 309 (310).

In all the exemplary embodiments, a self-supporting body structure, in particular of a body center section, including a cross member and a rear floor is created. Both the cross member and the rear floor are made of fiber-reinforced plastic material. The cross member and the rear floor are components having a monocoque construction of the self-supporting body structure.

The respective elements made of the fiber-reinforced, in particular carbon fiber reinforced, plastic material are produced in what is known as the resin transfer molding (RTM) method.

Here, semi-finished fiber products, in particular preforms made of carbon fiber mats, are inserted into a corresponding mold and are insert molded with a plastic compound, comprising a resin and a curing agent, for example.

The carbon fiber mats have a five-layer design, wherein the fiber orientation of the first mat runs at an angle of approximately 45° relative to the transverse vehicle direction, the fiber orientation of the second mat runs at an angle of approximately −45° C. relative to the transverse vehicle direction, the fiber orientation of the third mat runs in the transverse vehicle direction, which is to say at an angle of approximately 0°, the fiber orientation of the fourth mat runs at an angle of approximately 45° relative to the transverse vehicle direction, and the fiber orientation of the fifth mat runs at an angle of approximately +45° relative to the transverse vehicle direction.

The motor vehicle body of the present invention is designed for a motor vehicle having two rows of seats, wherein the rear row of seat extends over the rear floor.

Overall, the motor vehicle center section of the motor vehicle body has a monocoque construction comprising elements made of carbon fiber reinforced plastic material. All the monocoque construction elements of the body center section are glued to each other.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle body, comprising:
a body center section, wherein
the body center section includes a rear floor and a cross member connected to the rear floor, and
the rear floor and the cross member are made of fiber-reinforced plastic material, wherein
the cross member together with a front end region of the rear floor form a closed hollow section, and
the cross member forms an outermost surface of the closed hollow section.

2. The motor vehicle body according to claim 1, further comprising:
a left lateral longitudinal beam and a right lateral longitudinal beam, wherein
the cross member extends between the left lateral longitudinal beam and the right lateral longitudinal beam.

3. The motor vehicle body according to claim 2, further comprising:
a front floor, wherein
the cross member is disposed between the front floor and the rear floor,
an upper end of the cross member is connected to the rear floor, and
a lower end of the cross member is connected to the front floor.

4. The motor vehicle body according to claim 3, wherein
the upper end of the cross member is connected to a top side or a bottom side of the rear floor, and
an upper end region of the cross member is configured to overlap a front end region of the rear floor.

5. The motor vehicle body according to claim 4, wherein
the upper end region of the cross member and the front end region of the rear floor together form the closed hollow section.

6. The motor vehicle body according to claim 5, wherein the cross member comprises a front cross member element and a rear cross member element connected to one another.

7. The motor vehicle body according to claim 6, wherein the front cross member element and the rear cross member element overlap each other in an upper substantially horizontal region of the cross member.

8. The motor vehicle body according to claim 1, further comprising:
a front floor, wherein
the cross member is disposed between the front floor and the rear floor,
an upper end of the cross member is connected to the rear floor, and
a lower end of the cross member is connected to the front floor.

9. The motor vehicle body according to claim 3, wherein the cross member comprises a front cross member element and a rear cross member element connected to one another.

10. The motor vehicle body according to claim 4, wherein the cross member comprises a front cross member element and a rear cross member element connected to one another.

11. The motor vehicle body according to claim 1, further comprising:
a front floor, wherein
the cross member is connected to the rear floor, and the rear floor is connected to the front floor.

12. The motor vehicle body according to claim 2, further comprising:
a front floor, wherein
the cross member is connected to the rear floor, and the rear floor is connected to the front floor.

13. The motor vehicle body according to claim 1, wherein the fiber-reinforced plastic material of the rear floor and the cross member has fibers oriented in a transverse direction of the motor vehicle body.

14. The motor vehicle body according to claim 7, wherein the fiber-reinforced plastic material of the rear floor and the cross member has fibers oriented in a transverse direction of the motor vehicle body.

15. The motor vehicle body according to claim 1, wherein the motor vehicle body is a self-supporting motor vehicle body.

16. A motor vehicle body, comprising:
a body center section, wherein
the body center section includes a front floor, a rear floor, and a cross member that is connected to the front floor and to the rear floor,
the rear floor and the cross member are made of fiber-reinforced plastic material, and
the cross member includes two contact points at which the cross member contacts with and is fastened to the rear floor, the two contact points being separated by a hollow section along which the cross member and the rear floor do not contact one another.

17. A motor vehicle body, comprising:
a body center section;
a left lateral longitudinal beam and a right lateral longitudinal beam; and
a front floor, wherein
the body center section includes a rear floor and a cross member connected to the rear floor,
the rear floor and the cross member are made of fiber-reinforced plastic material,
the cross member extends between the left lateral longitudinal beam and the right lateral longitudinal beam,
the cross member is disposed between the front floor and the rear floor,
an upper end of the cross member is connected to the rear floor,
a lower end of the cross member is connected to the front floor,
the upper end of the cross member is connected to a top side or a bottom side of the rear floor, and
an upper end region of the cross member is configured to overlap a front end region of the rear floor.

18. A motor vehicle body, comprising:
a body center section;
a left lateral longitudinal beam and a right lateral longitudinal beam; and
a front floor, wherein
the body center section includes a rear floor and a cross member connected to the rear floor,
the rear floor and the cross member are made of fiber-reinforced plastic material,
the cross member extends between the left lateral longitudinal beam and the right lateral longitudinal beam,
the cross member is disposed between the front floor and the rear floor,
an upper end of the cross member is connected to the rear floor,
a lower end of the cross member is connected to the front floor, and
the cross member comprises a front cross member element and a rear cross member element connected to one another.

* * * * *